3,218,288
METHYL NADIC AND HEXAHYDROPHTHALIC ANHYDRIDE AS CURING AGENTS FOR EPOXIDIZED NOVOLAC RESINS
Joe A. Warburton, Melrose, Mass., assignor to General Electric Company, a corporation of New York
No Drawing. Filed Aug. 17, 1961, Ser. No. 132,015
5 Claims. (Cl. 260—37)

This invention relates to expoxy resins. More particularly, it relates to an epoxy resin formulation having low weight loss and low shrinkage characteristics upon the aging thereof at elevated temperature.

With the rapid advance of technology occurring at this time, the components of many instruments such as field coils of high temperature tachometer generators, coils of permanent magnet generators, etc., require high temperature potting, cementing, finishing, and electrical insulating materials which are capable of withstanding severe thermal aging and cycling, high humidity, salt spray, fungus, vibration and diester type oils.

Heretofore, silicone resins have been the most frequently used type of insulating material for high temperature applications. Although silicone resins retain relatively good properties at high temperatures, they are generally unsatisfactory at high temperatures when used with synthetic diester oils. At relatively high temperatures, such diester oils may deleteriously affect silicone resin insulation, whereby the silicone resin may crack, flake, soften or blister.

Accordingly, it is an important object of this invention to provide an impregnating, encapsulating and coating material having low weight loss and low shrinkage characteristics on aging at elevated temperatures.

It is another object to provide an impregnating, encapulating and coating material which withstands severe thermal cycling, humidity, salt spray, fungus vibration, etc., and can be practicably utilized with synthetic diester oils at high temperatures.

It has been found that these and other objects are accomplished with the use of epoxylated novolac resins hardened with a mixture of nadic methyl anhydride, which is methylbicyclo(2.2.1) heptene-2,3-dicarboxylic anhydride isomer, and hexahydrophthalic anhydride.

Novolac epoxy resins are high functionally expoxide resins generally having higher plastic deformation points and better thermal aging properties than comparable bisphenol resins of lower functionality. A typical epoxylated novolac resin is that manufactured by the Dow Chemical Company and designated as Dow D.E.N. 438. This resin has the following structural formula as shown in the Dow Chemical Technical Bulletin on D.E.N. 438, published 1960.

where $n=1.6$. This resin has 3.6 epoxy groups per molecule.

Nadic methyl anhydride which has the following structural formula

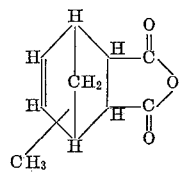

is a liquid at room temperature and is compatible with liquid and low-melting epoxy resins. It produces systems with low viscosity, long pot lives, high plastic deformation points and good thermal stability. When used alone, it has a relatively long cure cycle which can be shortened by the use of small amounts of amine accelerators.

Hexahydrophthalic anhydride is a low melting solid which is easily incorporated into warm resins. It is quite similar to nadic methyl anhydride except that it produces a cured resin with a somewhat lower plastic deformation point.

Generally speaking and in accordance with the invention, there is provided a composition comprising 95 to 105 parts by weight of an epoxylated novolac resin, 80 to 90 parts by weight of anhydride comprising from about 70 to 80 parts by weight of hexahydrophthalic anhydride, and up to 20 parts by weight of methylated maleic acid adduct of phthalic anhydride and up to 75% by weight of the total composition of a filler material, the filler material preferably being characterized by a relatively slight negative coefficient of thermal expansion.

The filler material may suitably be the substance known by the trade name Zerifac which is a lithium aluminum silicate manufactured by Foote Mineral Company and which has the aforestated relatively slight negative coefficient of thermal expansion. The filler may also suitably be a material such as slate, sand or calcium carbonate.

The features of this invention which are believed to be new are set forth with particularity in the appended claims. The invention itself, however, may best be understood by reference to the following description which show embodiments of a resin according to the invention.

To carry out the invention, chosen quantities within the ranges set forth hereinabove of the epoxylated novolac resin, nadic methyl anhydride, hexahydrophthalic anhydride and Zerifac lithium aluminum silicate filler were mixed at room temperature and then subjected to various tests. The tests were as follows:

*Thermal cycling test.*—A section of stainless steel pipe 1⅜″ long having an outer diameter of 1½″ and a wall thickness of 3/16″ was cross-milled ⅛″ deep and 13/16″

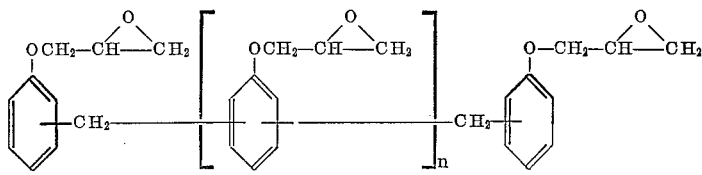

wide to form four posts having the appearance of truncated triangles. The pipe was set with the posts down into an aluminum weighing cup filled with the resin under test. The resin was then cured.

*Weight loss and shrinkage.*—Samples of resin for making this test were cast in a steel mold which produces bars having the dimensions 6″ x ½″ x 2″.

*Plastic deformation test.*—Samples of resin were cast in a steel mold that produced bars having approximately the dimensions 6″ x ½″ x ½″. The castings were then ground to 5″ x ½″ x ½″. The plastic deformation test was performed in accordance with the ASTM Specification D468 in which the sample was loaded with 264 p.s.i. and heated in a bath. The temperature of the bath was controlled to give a 2° C. per minute rise. The temperature at which there is a 10 mil deformation in the sample is the plastic deformation point.

Typical examples of compositions according to the invention are as follows: the parts are by weight.

*Example 1*

| | Parts |
|---|---|
| Epoxylated novolac resin (Dow D.E.N. 438) | 100 |
| Nadic methyl anhydride | 13.3 |
| Hexahydrophthalic anhydride | 75.2 |
| Lithium aluminum silicate | 188.5 |

The above constituents were mixed at room temperature and poured into an aluminum cup. The pipe as described for making the thermal cycling test was placed into the resin. The resin was then cured by the heating thereof at 125° C. for 16 hours and then at 232° C. for four hours.

The constituents were similarly mixed and cured for the weight loss test and for the heat distortion test.

The thermal aging data for the above example were as follows:

| Hours at 232° C. | Percent Weight Loss | Percent Shrinkage |
|---|---|---|
| 140 | 0.52 | |
| 248 | 1.2 | 0.29 |
| 392 | 1.5 | 0.56 |
| 560 | 1.56 | 0.91 |
| 700 | 2.2 | 1.1 |
| 1,864 | 5.5 | 2.6 |

| Hours at 260° C. | Percent Weight Loss | Percent Shrinkage |
|---|---|---|
| 72 | 0.85 | 0.2 |
| 167 | 2.1 | 0.75 |

In the thermal cycling test, the resin remained intact at high temperatures.

*Example 2*

| | Parts |
|---|---|
| Epoxylated novolac resin (Dow D.E.N. 438) | 100 |
| Nadic methyl anhydride | 13.3 |
| Hexahydrophthalic anhydride | 75.2 |
| Lithium aluminum silicate | 282 |

The constituents were mixed and the tests were performed the same as with the composition of Example 1. The following test results were obtained:

| Hours at 232° C. | Percent Weight Loss | Percent Shrinkage |
|---|---|---|
| 144 | 0.4 | |
| 282 | 0.75 | 0.083 |
| 422 | 0.9 | 0.23 |
| 1,486 | 3.1 | 1.5 |

The test piece remained intact in the thermal cycling test at elevated temperatures.

The formulation of Example 2 was also cured for 16 hours at 100 C., for four hours at 150° C. and for four hours at 232° C. It was then aged in the thermal aging test for 900 hours at 232° C. and has a weight of 2.2% and a shrinkage 1.1%. The thermal cycling test comprised aging at 257 hours at 232° C. with no sign of failure. When cooled to —55° C. it did not crack until several hours had elapsed.

The plastic deformation point of Example 2, when cured according to the above schedule, was approximately 195° C. Post curing Example 2 at 232° C. raised the deflection point to above 250° C.

*Example 3*

| | Parts |
|---|---|
| Epoxylated novolac resin (Dow D.E.N. 438) | 100 |
| Nadic methyl anhydride | 13.3 |
| Hexahydrophthalic anhydride | 75.2 |
| Lithium aluminum silicate filler | 442.0 |

In this example, the mixture had to be slightly warmed to achieve pourability. After 1,068 hours at 232°, the test samples had a weight loss of 1.2% and a shrinkage of 0.8%.

*Example 4*

| | Parts |
|---|---|
| Epoxlated novolac resin (Dow D.E.N. 438) | 100.0 |
| Nadic methyl anhydride | 13.3 |
| Hexahydrophthalic anhydride | 75.2 |

To further test the invention, several aircraft instrument coils wound with Teflon halogenated hydrocarbon insulated wire were vacuum impregnated with the formulation of Example 4. The impregnated coils were then mounted on a spindle and rotated around the axis of the core under heat lamps until the resin gelled. They were then cured for 16 hours at 125° and for four hours at 232° C.

The resin on the coils was then aged for 400 hours at 200° C. and 232° C. without any visible cracks in the resin.

After thermal aging, all samples were cycled for ten cycles between —65° C. and room temperature. After such cycling, the resins did not crack.

All of the coils were then subjected to a vibration of 50 cycles per second at 60 mil deflection for three hours. There were no adverse effects produced in the test coils.

The coils were then immersed for 24 hours in diester fluid (MIL-L-7808) at 205° C. The resins on the coils were completely unaffected by this treatment.

From the above, it is seen that with the composition of this invention, there is provided an encapsulating and potting material which has very low weight loss and shrinkage characteristics at elevated temperatures and which is extremely strong at high temperatures, the material showing little plastic deformation.

It is appreciated that the filler may or may not be necessary.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed as new and desired to be secured by Letters Patent of the United States is:

1. A composition of matter obtained by heating together a mixture comprising 100 parts by weight of an epoxylated novolac resin having the formula $$\text{OCH}_2\text{-CH-CH}_2 \quad \left[ \text{OCH}_2\text{-CH-CH}_2 \right] \quad \text{OCH}_2\text{-CH-CH}_2$$

wherein $n$ is about 1.6, about 75 parts by weight of hexahydrophthalic anhydride and about 13 parts by weight of methylbicyclo(2.2.1)heptene-2,3-dicarboxylic anhydride isomer having the formula

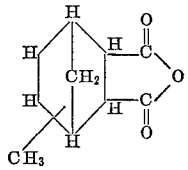

2. A composition of matter as in claim 1 including about 188 parts by weight of a filler.

3. A composition as in claim 1 including about 280 parts by weight of filler.

4. A composition as in claim 1 including about 440 parts by weight of filler.

5. A composition as in claim 1 including up to about 440 parts by weight of filler.

References Cited by the Examiner

UNITED STATES PATENTS

| | | | |
|---|---|---|---|
| 2,744,845 | 5/1956 | Rudoff | 260—37 |
| 2,801,989 | 8/1957 | Farnham | 260—37 XR |
| 2,840,540 | 6/1958 | Rosenberg et al. | 260—37 XR |
| 2,890,204 | 6/1959 | Delmonte | 260—47 |
| 3,018,264 | 1/1962 | Colclough | 260—37 |

FOREIGN PATENTS 746,824  3/1956  Great Britain.

OTHER REFERENCES

Lee et al., "Epoxy Resins," published by McGraw-Hill, 1957, pages 18–20 and 150–151 relied on.

MORRIS LIEBMAN, *Primary Examiner.*

MILTON STERMAN, *Examiner.*